(12) United States Patent
Mirzaei et al.

(10) Patent No.: US 10,246,892 B1
(45) Date of Patent: Apr. 2, 2019

(54) FILTER BOOSTER PUMP COMBINATION

(71) Applicant: Waterway Plastics, Oxnard, CA (US)

(72) Inventors: M Reza Mirzaei, Agoura Hills, CA (US); William Crane Spears, Camarillo, CA (US)

(73) Assignee: Waterway Plastics, Oxnard, CA (US)

( * ) Notice: Subject to any disclaimer, the term of this patent is extended or adjusted under 35 U.S.C. 154(b) by 0 days.

(21) Appl. No.: 15/494,749

(22) Filed: Apr. 24, 2017

Related U.S. Application Data

(60) Provisional application No. 62/327,562, filed on Apr. 26, 2016.

(51) Int. Cl.
| | |
|---|---|
| *E04H 4/12* | (2006.01) |
| *F04D 13/06* | (2006.01) |
| *F04D 15/00* | (2006.01) |
| *F04D 29/18* | (2006.01) |
| *F04D 29/70* | (2006.01) |
| *E04H 4/16* | (2006.01) |
| *C02F 1/00* | (2006.01) |
| *C02F 103/42* | (2006.01) |

(52) U.S. Cl.
CPC ............ *E04H 4/1245* (2013.01); *C02F 1/001* (2013.01); *C02F 1/008* (2013.01); *E04H 4/1218* (2013.01); *E04H 4/16* (2013.01); *F04D 13/06* (2013.01); *F04D 15/0005* (2013.01); *F04D 15/0066* (2013.01); *F04D 29/18* (2013.01); *F04D 29/708* (2013.01); *C02F 2103/42* (2013.01)

(58) Field of Classification Search
CPC ....... E04H 4/1245; E04H 4/16; E04H 4/1218; F04D 29/708; F04D 29/18; F04D 15/0005; F04D 15/0066; F04D 13/06; C02F 1/001; C02F 1/008; C02F 2103/42
USPC ...... 210/167.1, 167.16, 416.1, 416.2, 167.12
See application file for complete search history.

(56) References Cited

U.S. PATENT DOCUMENTS

| | | | | |
|---|---|---|---|---|
| 4,141,101 A | * | 2/1979 | Gibellina | E04H 4/1681 15/1.7 |
| 2009/0151801 A1 | * | 6/2009 | Gorman | F04D 13/14 137/565.11 |
| 2011/0286859 A1 | * | 11/2011 | Ortiz | F04B 49/002 417/20 |
| 2014/0314062 A1 | * | 10/2014 | Loebs | H04L 12/2803 370/338 |
| 2017/0212536 A1 | * | 7/2017 | Potucek | G05D 21/02 |

* cited by examiner

*Primary Examiner* — Fred Prince
(74) *Attorney, Agent, or Firm* — Sandy Lipkin

(57) ABSTRACT

A swimming pool filtration systems and particularly toward a variable speed pump equipped with an electronically commutated motor, capable of producing variable water pressure heads suitable for operating swimming pool pressure cleaners as well as swimming pool filters. An electronically controlled electric actuating diverter valve is used to divert water flow to the filter or the pressure cleaner.

13 Claims, 3 Drawing Sheets

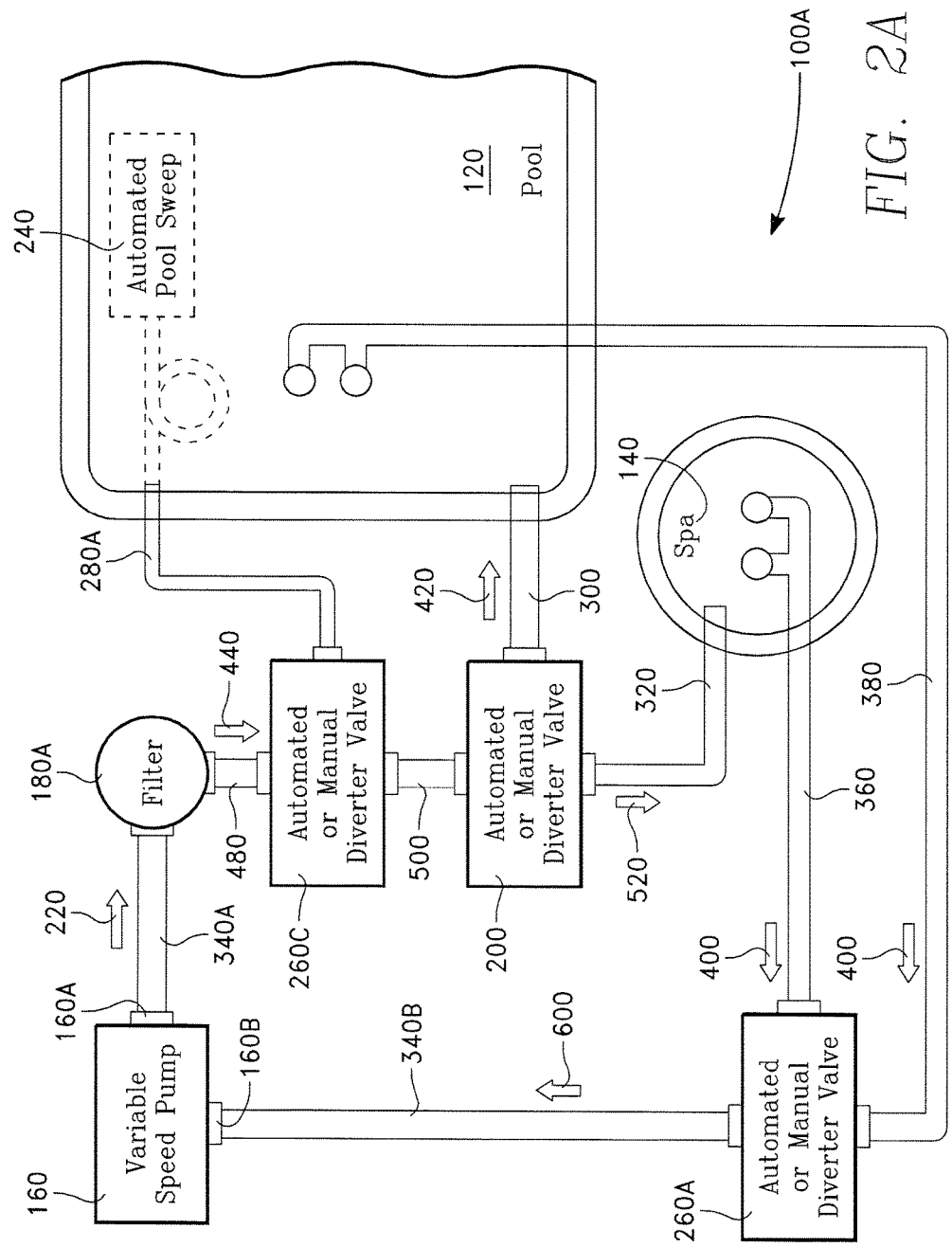

FILTER BOOSTER PUMP COMBINATION

REFERENCE TO PRIOR APPLICATION

This application claims priority of the provisional patent application 62/327,562, filed Apr. 26, 2016 entitled FILTER BOOSTER PUMP COMBINATION by Ray Mirzaei and Willy Spears.

BACKGROUND OF THE INVENTION

Field of the Invention

The field of this invention relates generally to the field of swimming pool filtration systems and particularly toward a variable speed pump equipped with an electronically commuted motor, capable of producing variable water pressure heads suitable for operating swimming pool pressure cleaners as well as swimming pool filters.

Description of the Prior Art

Since swimming pool pump pressure cleaners require a high operating pressure head to operate, historically a system comprising a swimming pool filtration pump and a separate booster pressure pump is used. The swimming pool filter pump supplies the necessary water flow to the booster pump then the booster pump increases the water pressure head and then supplies the high pressure water to the swimming pool pressure cleaner.

There are several issues and disadvantages with this system. Booster pumps are not self-priming and unless they receive the water supply from a filtration pump, they become inoperable. Furthermore, the shaft seal may burn due to a dry run. Booster pumps typically are equipped with a single phase induction motor which is less energy efficient than electronically commuted variable speed motors. Booster pumps have fixed speeds and hydraulic output and lack the necessary adjustability. As a result, swimming pool pressure cleaners are equipped with a bypass valve which waste and discharge the excess water to the swimming pool. As a result, swimming pool pressure cleaner systems utilizing booster pumps consume more electricity.

It is the object of the instant invention to provide an improved system that overcomes the shortcomings of the prior art.

SUMMARY OF THE INVENTION

The basic embodiment of the present invention teaches a variable speed swimming pool filter and booster pump combination equipped with an electronically commutated motor comprising: a relay or a solid state power switching device; and a microprocessor control system that adjusts the speed of said motor and resultant operating head of said pump and actuates an electrically diverter valve to divert water to a swimming pool pressure cleaner when selectively operates in cleaning mode or to a swimming pool filter when in filtration mode.

The above embodiment can be further modified by defining that said electronically commutated motor is capable of operating at 3700 rounds per minute or higher.

An alternate embodiment teaches a variable speed swimming pool pump equipped with an electronically commutated motor comprising: a high pressure head impeller with a minimum diameter of five inches; a relay or a solid state power switching device; and a microprocessor control system that adjusts the speed of said motor and resultant operating head of said pump and actuate an electrically actuated diverter valve to divert the water a swimming pool pressure cleaner when selectively operates in cleaning mode or a swimming pool filter when in filtration mode.

The above embodiment can be further modified by defining that the swimming pool filter and booster pump combination, with or without a relay or a solid state power switching device wherein a separate pool control controls said actuation diverter valve and diverts water to said pool cleaner when in cleaning mode and diverts water to said pool filter when in filtration mode.

The above embodiment can be further modified by defining that the swimming pool pump equipped with an electronically commutated motor, with or without a relay or a solid state power switching device wherein a separate pool control controls said actuation diverter valve and diverts water to said pool cleaner when in cleaning mode and diverts water to said pool filter when in filtration mode.

An alternate embodiment teaches a variable speed swimming pool pump equipped with an electronically commutated motor comprising: a microprocessor control system that adjusts the speed of said motor and resultant operating head of said pump and a manually actuated diverter valve to divert water to a swimming pool pressure cleaner when the pump selectively operates in cleaning mode or to a swimming pool filter when in filtration mode.

The above embodiment can be further modified by defining that said electronically commutated motor is capable of operating at 3700 rounds per minute or higher.

An alternate embodiment teaches a variable speed swimming pool pump equipped with an electronically commutated motor comprising: a high pressure head impeller with a minimum diameter of five inches; a microprocessor control system that adjusts the speed of said motor and resultant operating head of said pump; and a manually actuated diverter valve to divert water to a swimming pool pressure cleaner when the pump selectively operates in cleaning mode or to a swimming pool filter when in filtration mode.

An alternate embodiment teaches a variable speed pool cleaner booster pump equipped with an electronically commutated motor which allows for adjustment of the pump pressure head.

The above embodiment can be further modified by defining that said variable speed pump motor has a shaft horsepower of 1.65 or less.

An alternate embodiment teaches a variable speed swimming or spa pool filter and booster pump combination comprising: an electrically commutated motor; at least three relays or solid state power switching devices; a microprocessor control system that adjusts the speed of said motor and resultant operating head of said pump and actuates an electrically actuated diverter valve to divert water to a swimming pool or spa pressure cleaner when in cleaning mode or to a swimming pool or spa filter when in filtration mode wherein said control system selectively actuates a second diverter valve to divert water return to a pool or spa and actuates a third diverter valve to divert water intake.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 2A is a schematic view of an alternate embodiment of the system of the instant invention.

DETAILED DESCRIPTION OF A PREFERRED EMBODIMENT

Figure 1:
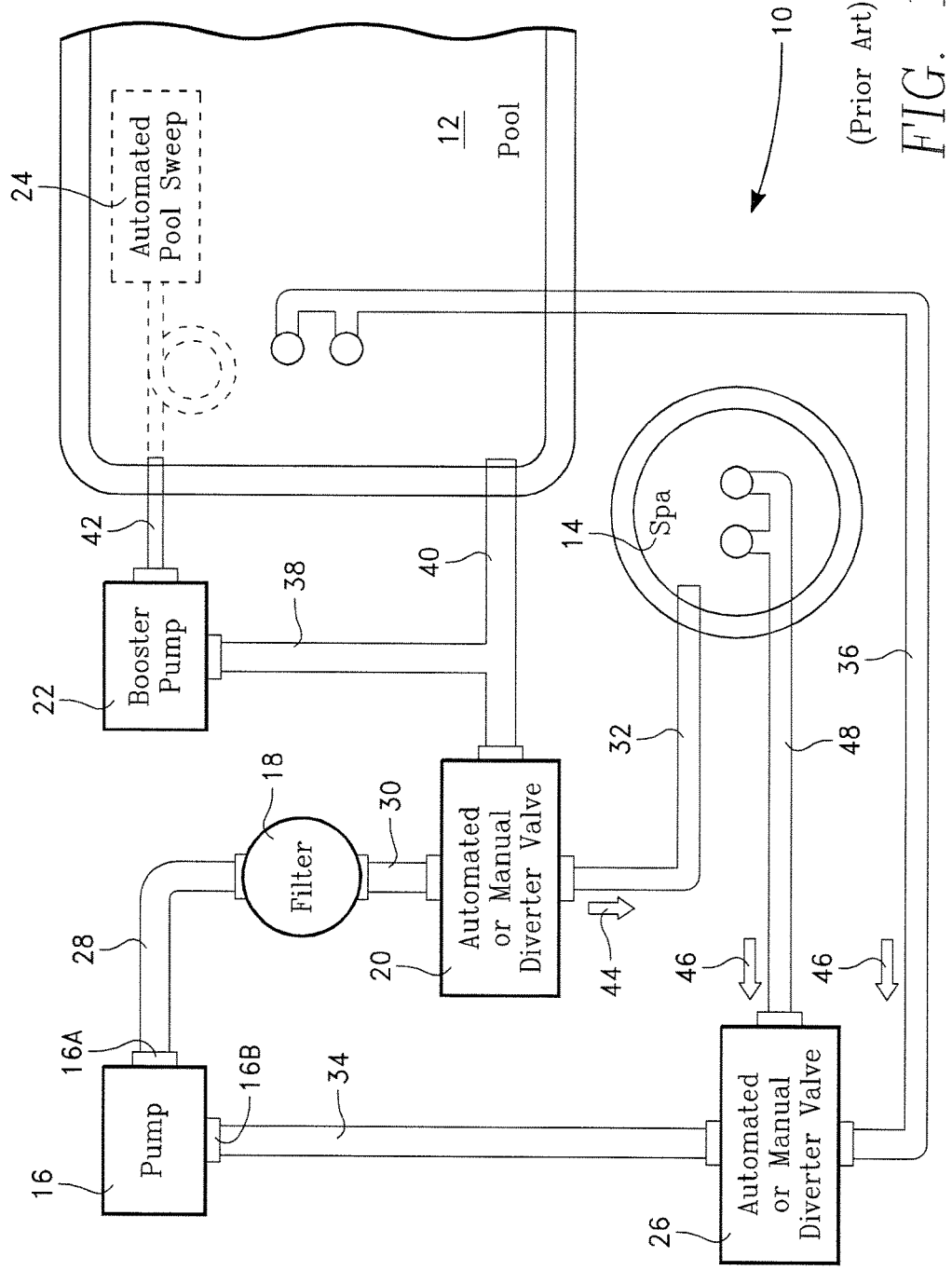
FIG. 1 is a schematic view of a typical prior art system.

Turning to the drawings, the preferred embodiment is illustrated and described by reference characters that denote similar elements throughout the several views of the instant invention.

The instant invention discloses a variable speed pump capable of producing the necessary range of variable pressure suitable for operating both the swimming pool filter and the swimming pool pressure cleaner that eliminates the need for the use of a separate booster pump and will reduce the cost of electricity for consumers.

An electronically controlled and electrically actuated diverter valve diverts the water to the pressure cleaner when the pump is in high pressure head mode and will divert the water to swimming pool filter when the pump is in low pressure head mode.

In FIG. 1 a typical prior art system 10 is shown schematically. In this schematic the system is shown to operate either with a swimming pool 12 or a spa 14. The pump discharge port 16A is connected via conduit 28 to the filter 18 which is connected by conduit 30 to the automated or manual diverter valve 20. The diverter valve 20 is then connected via conduit 40 to the swimming pool 12, said conduit 40 also being connected via conduit 38 to a booster pump 22 which is then connected via conduit 42 to the automated pool sweep/cleaning system 24 inside the swimming pool 12.

Illustrating the typical prior art spa configuration the pump suction port 16B is connected via conduit 34 to the automated or manual diverter valve 26 which is connected via conduit 36 to the pool and via conduit 48 to the spa 14. The arrows 44 indicate the flow of water from the diverter valve 20 to the spa and the arrows 46 indicate the flow of water from the spa 14 and the pool 12 back to the diverter valve 26.

Figure 2:
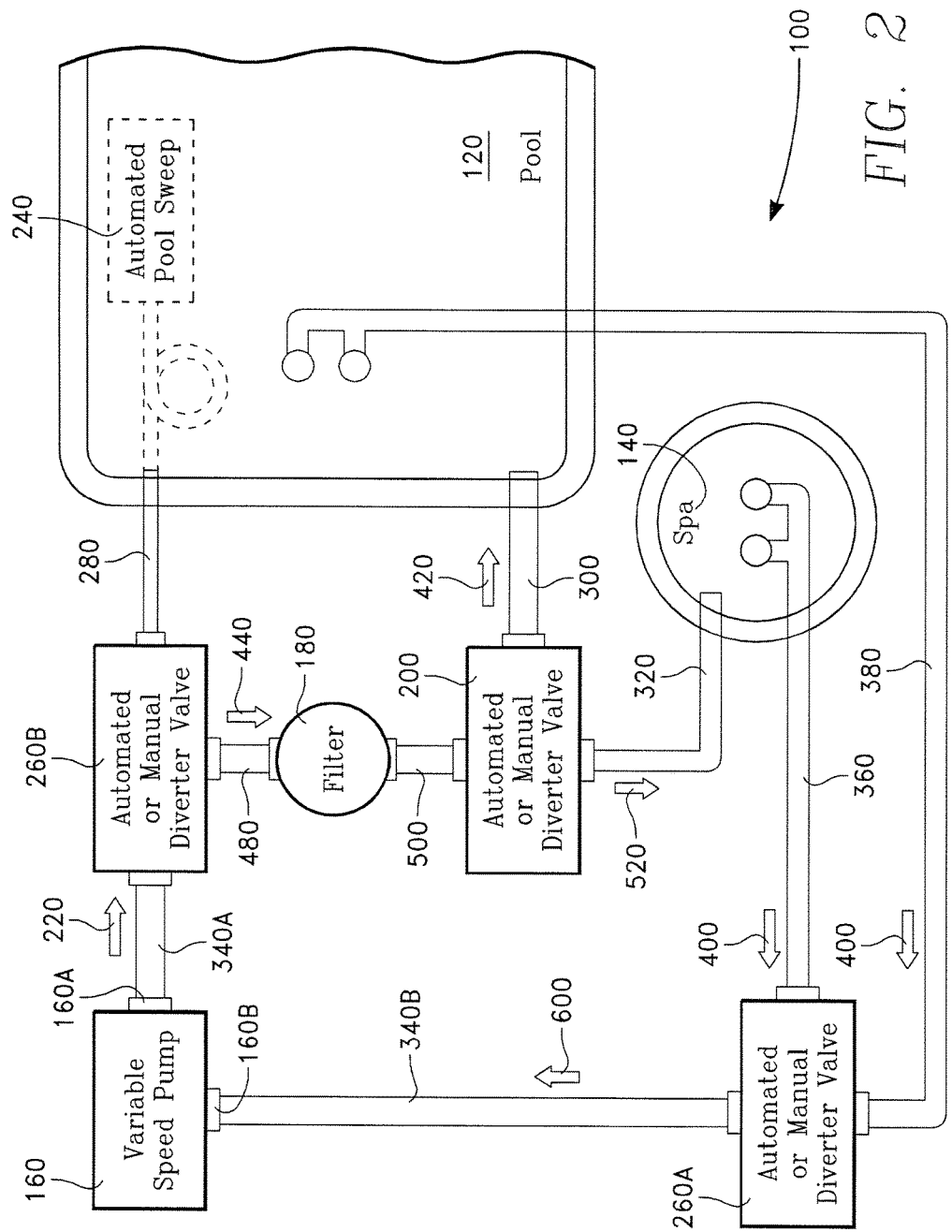
FIG. 2 is a schematic view of the preferred embodiment of the system of the instant invention.

FIG. 2 shows the improved configuration of the instant invention that provides the improvements outlined above. The instant system 100 defines a variable speed pump 160 that operates for both a swimming pool 120 and a spa 140 and eliminates the need for a booster pump. The variable speed pump 160 connects via conduit 340A to the automated or manual diverter valve 260B which is then connected by conduit 280 to the automated pool pressure cleaner sweep 240 inside the swimming pool 120. The diverter valve 260B is also connected via conduit 480 to the filter 180 which is connected by conduit 500 to another automatic or manual diverter valve 200 which then connects to the pool 120 via conduit 300 or via conduit 320 to the spa 140.

Alternatively, the variable speed pump suction port 160B can connect via conduit 340B to the automated or manual diverter valve 260A via conduit 360 to the spa 140 or via conduit 380 to the pool 120. The direction of water flow in the first configuration is indicated by the arrows 220, 440, 420 and 520. Water flow return is indicated by the arrows 400, 600.

The variable speed pump is equipped with an electronically commutated motor capable of producing a range of operating pressure head suitable for both filtration and use with an automated pool pressure cleaner sweep and includes at least one relay or a solid state power switching device and a microprocessor control system that adjusts the speed of the motor and resultant operating head of the pump. It then actuates an electrically actuated diverter valve to divert the water to a swimming pool pressure cleaner when in cleaning mode or the swimming pool filter when in filtration mode.

Alternatively, the variable speed combination pool and booster pump can be equipped with an electronically commutated motor that has a high pressure head impeller with a minimum diameter of 5 inches, a relay or a solid state power switching device and microprocessor control system that adjusts the speed of the motor and resultant operating head of the pump and that actuates an electrically actuated diverter valve to divert the water to the swimming pool pressure cleaner when in cleaning mode or to the swimming pool filter when in filtration mode.

The pool filtration and booster pump combination can be used with a separate pool control that controls the actuation of the diverter valve and diverts the water to the pool cleaner when in cleaning mode and diverts the water to the pool filter when in filtration mode.

Alternatively, the diverter valve can be manually actuated as well as electrically. Further, the pump is equipped with an electronically commutated motor which allows for adjustment of the pump pressure head. In an alternative embodiment, the variable speed pump motor may have a shaft horsepower of 1.65 or less.

FIG. 2A illustrates an alternate embodiment wherein the filter pump 180A is located before the diverter valve 260C before water is returned 280A to the pool 120.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A device for producing variable water pressure heads suitable for operating swimming pool pressure cleaners as well as swimming pool filters comprising:
   a single pump that acts as a hybrid between a pressure-side pool cleaner booster pump and a filter pump, said single pump being variable speed and being equipped with an electronically commutated motor;
   a relay or a solid state power switching device; and
   a microprocessor control system that adjusts the speed of said motor and resultant operating head of said pump and actuates an electrically-actuated diverter valve to divert water to a swimming pool pressure cleaner when the pump selectively operates in cleaning mode or to a swimming pool filter when in filtration mode.

2. The device as defined in claim 1 wherein said electronically commutated motor is capable of operating at 3700 rounds per minute or higher.

3. The device as defined in claim 1, with or without a relay or a solid state power switching device; wherein a separate pool control controls said actuation diverter valve and diverts water to said pool cleaner when in cleaning mode and diverts water to said pool filter when in filtration mode.

4. The device as defined in claim 1 wherein said variable speed pump motor has a shaft horsepower of 1.65 or less.

5. A device for producing variable water pressure heads suitable for operating swimming pool pressure cleaners as well as swimming pool filters comprising:
   a variable speed swimming pool pump operating without a booster pump that is equipped with an electronically commutated motor;
   an impeller with a minimum diameter of five inches;
   a relay or a solid state power switching device; and
   a microprocessor control system that adjusts the speed of said motor and resultant operating head of said pump and actuate an electrically actuated diverter valve to divert the water to a swimming pool pressure cleaner when the pump selectively operates in cleaning mode or a swimming pool filter when in filtration mode.

6. The device as defined in claim 5 with or without a relay or a solid state power switching device; wherein a separate pool control controls said actuation diverter valve and diverts water to said pool cleaner when in cleaning mode and diverts water to said pool filter when in filtration mode.

7. A device for producing variable water pressure heads suitable for operating swimming pool pressure cleaners as well as swimming pool filters comprising:
   a variable speed swimming pool pump operating without a booster pump that is equipped with an electronically commutated motor;
   a microprocessor control system that adjusts the speed of said motor and resultant operating head of said pump and
   a manually actuated diverter valve to divert water to a swimming pool pressure cleaner when the pump selectively operates in cleaning mode or to a swimming pool filter when in filtration mode.

8. The device as defined in claim 7 wherein said electronically commutated motor is capable of operating at 3700 rounds per minute or higher.

9. A device for producing variable water pressure heads suitable for operating swimming pool pressure cleaners as well as swimming pool filters comprising:
   a variable speed swimming pool pump operating without a booster pump that is equipped with an electronically commutated motor;
   an impeller with a minimum diameter of five inches;
   a microprocessor control system that adjusts the speed of said motor and resultant operating head of said pump; and
   a manually actuated diverter valve to divert water to a swimming pool pressure cleaner when the pump selectively operates in cleaning mode or to a swimming pool filter when in filtration mode.

10. A device for producing variable water pressure heads suitable for operating swimming pool pressure cleaners as well as swimming pool filters comprising:
    a single pump that acts as a hybrid between a pressure-sided pool cleaner booster pump and a filter pump, said single pump being variable speed and being equipped with an electronically commutated motor which allows for adjustment of the pump pressure head.

11. The device as defined in claim 10 wherein said electronically commutated motor is capable of operating at 3700 rounds per minute or higher.

12. The device as defined in claim 10 wherein said variable speed pump motor has a shaft horsepower of 1.65 or less.

13. A device for producing variable water pressure heads suitable for operating swimming pool pressure cleaners as well as swimming pool filters comprising:
    a single pump that acts as a hybrid between a pressure-sided pool cleaner booster pump and a swimming or spa pool filter, said single pump being variable speed;
    an electrically commutated motor;
    at least three relays or solid state power switching devices;
    a microprocessor control system that adjusts the speed of said motor and resultant operating head of said pump and actuates an electrically actuated diverter valve to divert water to a swimming pool or spa pressure cleaner when in cleaning mode or to a swimming pool or spa filter when in filtration mode wherein said control system selectively actuates a second diverter valve to divert water return to a pool or spa and actuates a third diverter valve to divert water intake.

* * * * *